July 3, 1973    J. A. GROSS    3,743,564
VALVE AND MEMBRANE APPARATUS FOR RECAPPING TIRE CASINGS
Filed Dec. 21, 1970    3 Sheets-Sheet 3

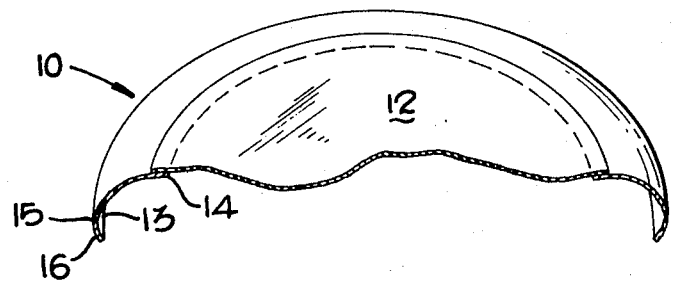
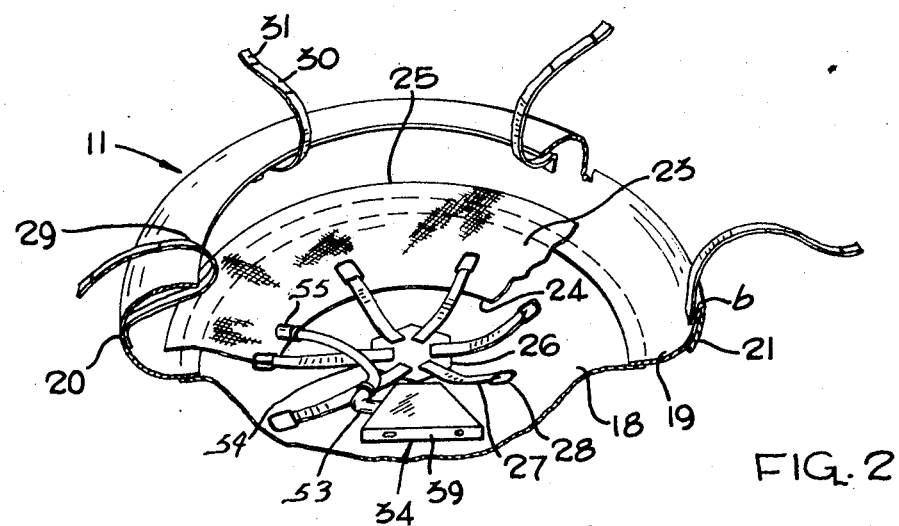
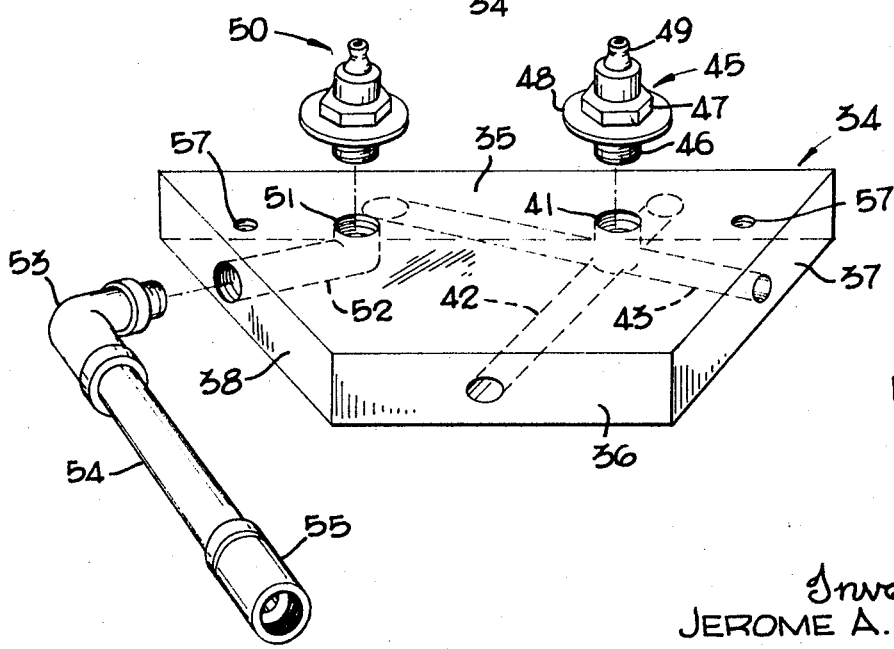

Inventor
JEROME A. GROSS
By Jerome A. Gross
Attorney

United States Patent Office 3,743,564
Patented July 3, 1973

3,743,564
VALVE AND MEMBRANE APPARATUS FOR
RECAPPING TIRE CASINGS
Jerome A. Gross, 6304 S. Rosebury,
Clayton, Mo. 63105
Continuation-in-part of application Ser. No. 874,929,
Nov. 7, 1969. This application Dec. 21, 1970, Ser.
No. 99,756
Int. Cl. B29h 5/04, 17/36
U.S. Cl. 156—394   4 Claims

ABSTRACT OF THE DISCLOSURE

Valved membrane apparatus for recapping tires with pre-formed tread strips in a pressure chamber. Valves externally of the membranes communicate to an inner tube the increases and decreases in pressure of air within the vulcanizing chamber, so that the tube applies to the inner surface of the casing a pressure substantially the same as is applied to the outer casing surface by the membranes— no air-pressure connection is made from outside the chamber to the interior of the inner tube.

Two elastic membranes, having molded outer portions overlapping sealedly and flat circular central portions, are evacuated through a passage in a spacer block between the membranes. The block also has an inflation passage to which the external valves are connected through one membrane; this inflation passage of the spacer block leads to a pressure hose connectable to the inner tube.

BACKGROUND OF THE INVENTION

The present invention relates to recapping tires with pre-formed tread strips, and is a continuation-in-part of my co-pending application Ser. No. 874,929, filed Nov. 7, 1969, entitled "Method and Apparatus for Recapping Tire Casings." To the extent of common subject matter disclosed in said co-pending application, priority is claimed to its filing date.

My said co-pending application makes reference to recapping in the manner provided in U.S. patent to Carver, No. 3,236,709. Carver's patent shows the use of an elastic annular cover which must be stretched to fit about the outer surface only of a casing, mounted on a wheel rim and containing an inner tube. His cover extends only to the beads of the casing, and is held in place against the flanges of the rim by pressure, applied within the tube, which always exceeds the ambient pressure. Curing takes place in a heated pressure chamber, through whose wall extends a venting hose through which the elastic annular cover is vented to outside atmospheric pressure. Also extending through the wall is an inflating pressure hose, connected to the inner tube, to maintain an excess of internal pressure over ambient pressure, of between 15 to 50 pounds per square inch.

The general purpose of the present invention is to achieve recapping results at least equal to those achieved with the Carver apparatus, with substantially easier handling. Specific purposes include eliminating the mounting of the casing on a rim, the stretching of an annular cover thereover, the connection in the vulcanizing chamber of an inflation hose, and the imposition and control of greater pressure within the casing than the ambient pressure within the chamber. Another purpose is to combine, in a simple apparatus, the principles of applying pressure by evacuating air within a cover and applying super-atmospheric pressure externally of the cover, yet maintaining the casing in normal configuration while the tread strip is vulcanized thereon. A further purpose is to include wicking means by which air is drawn radially inward. These, and other purposes which will be apparent from the specification, are achieved with the apparatus hereafter described.

SUMMARY OF THE INVENTION

In utilizing the present invention, a tire casing to be recapped is first buffed, as is conventional, to remove the tread and leave a substantially cylindrical surface. Over a vulcanizing adhesive applied to this surface, a length of pre-formed tread strip is cut and applied in place. An inner tube of suitable size is placed in the casing. The apparatus of the present invention is then utilized.

Summarizing generally, the present apparatus includes membrane apparatus, air evacuation apparatus and apparatus to communicate to the tube increases and decreases in pressure of the air within a conventional vulcanizing pressure chamber. The membrane apparatus includes two elastic membranes each fabricated with a circular central portion and an outer portion molded roundedly. The first of the membranes includes a margin rounded inwardly from the outermost circumference. It is back-folded outwardly along a circumferential line, to extend cuppedly back and inward. The second membrane has a relatively narrower margin at its outermost circumference; this is positioned over part of the back-folded margin of the first membrane. The broader margin of the first membrane is refolded over the margin of the second membrane; this stretches it to hold tightly against the outer surface of the margin of the second membrane. On evacuation of the membranes, ambient air pressure will seal the marign of the first membrane tightly against both the inner and outer surfaces of the second membrane, without escape of air which would follow from pressing downwardly into the tread pattern.

Wicking means extends from the outer portion of the tread area inwardly to the central portions of the membranes. Such wicking means includes porous cloth and straps secured at the center and brought around the casing to return to center. The wicking provides for the drawing of air, and of gases formed on vulcanizing, from the edge of the tread strip inward to air evacuation passages of a spacer block.

The spacer block is shallow with one flat side sealed against the inner surface of one of the membranes near its center. Though its edge surfaces air evacuation passages lead to an outlet through the membrane against which the block is positioned. An external vacuum coupling is located at the outlet of the air evacuation passage. An inflation passage extends through the spacer block to a pressure hose having a coupling for attachment to the inner tube. Connected to the outlet of the inflation passage, external of the membrane, is novel valving apparatus which communicates to the inner tube increases and decreases in the pressure of the gas within the vulcanizing chamber. A first valve opens on an increase of ambient pressure over internal pressure, to admit ambient gas into the inner tube as the pressure in the vulcanizing chamber rises. A second valve opens on an increment of internal pressure of ambient pressure, to discharge the pressure within the inner tube as the pressure in the vulcanizing chamber is lowered to atmospheric pressure. The second valve also limits the preliminary inflation of the inner tube when inflated to roundness before the membranes are evacuated.

Evacuation draws the central membrane portions together, inwardly of the beads of the casing, and also expands the inner tube to fit between the beads and against the drawn-together membranes. This leaves the casing in normal configuration. The assembly may then be placed within a pressurizable vulcanizing chamber, and the vacuum coupling connected to a hose leading through the chamber wall, either to the atmosphere or, preferably to a source of vacuum. As the chamber is pressurized and depressurized, its rise and fall in pressure will be communicated through the valving apparatus to the tube pressurizing the casing internal pressure in balance with the ambient pressure and thereby retaining the normal configuration of the casing as the tread strip is vulcanized to it.

BRIEF DESCRIPTION OF THE DRAWINGS

FIG. 1 is a fragmentary perspective view of an upper membrane fabricated according to the present invention.

FIG. 2 is a fragmentary view of a corresponding lower membrane with air wicking means and a spacer block.

FIG. 3 is an enlarged inverted view of the spacer block shown in FIG. 1, with fittings shown in exploded positions.

DESCRIPTION OF THE PREFERRED EMBODIMENT

Figure 4:
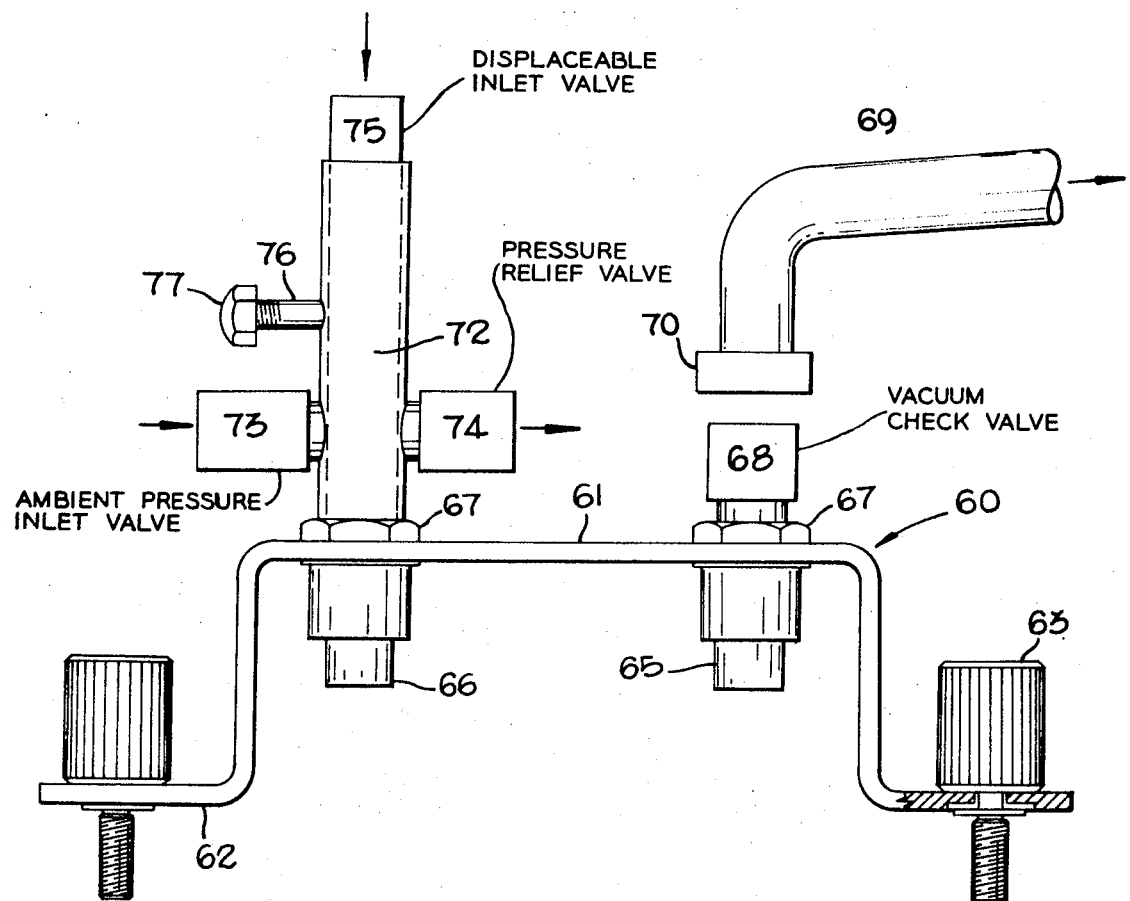
FIG. 4 is a similarly enlarged view of an assembly of air evacuation and inlet air valve means attachable to the spacer block of FIG. 3.

In the embodiment of the invention illustrated, upper and lower membranes generally designated 10 and 11 are fabricated by vulcanizing rounded outer portions, cut from molded large size inner tubes, to the outer circular edges of center pieces of air-impermeable elastic flat sheet rubber. Thus the upper membrane 10 (referred to in the claims as the second membrane) is fabricated by cutting from such sheet rubber a circular central portion 12, whose diameter is somewhat less than the outer diameter of the casing to be recapped; and by vulcanizing, in a lap joint at its outer edge, a molded outer portion 13 cut from a molded inner tube substantially large enough to fit, with some stretching closely around the casing and tread strip to be vulcanized. The portion of such tube utilized extends from the centerline 14 in the plane of its upper side, outward curvedly to at least its outermost circumference 15. Since a sealing margin 16 must be provided, I prefer to utilize that portion of such inner tube which extends beyond the outermost circumference 15 by about two inches.

The lower membrane is formed similarly, having an air-impermeable sheet rubber circular central portion 18 and an outer portion 19 cut from a large molded inner tube. The outer portion 19 utilizes more of such an inner tube than the outer portion 13 of the upper membrane 10; specifically it utilizes substantially the entire radially outer half of such a tube. From its radially outermost circumference 20 it continues roundedly inward, to provide a relatively broad margin 21. The margin 21 is to be turned outwardly and back along a circumferential line of backfold b at a level preferably slightly above the radially outermost circumference; so inverted, it will extend cuppedly back toward the central portion 18 as shown at the right side of FIG. 2.

Means are provided for conducting or "wicking" air from the region of recapping, inwardly between the central portions 12, 18 to evacuation apparatus to be described. FIG. 2 shows a large disk-like wicking piece of coarse, loosely woven textile material 23 such as burlap, which extends from a central cutout 24 to an outer margin 25 lying within and adhered to the central membrane portion 18 and outer membrane portion 19. Within its cutout center, sewn to a hexagonal cloth center 26 similarly adhered, are six short flexible straps 27 radiating from the center 26 at equal angular distances and terminating in end buckles 28.

Figure 6:
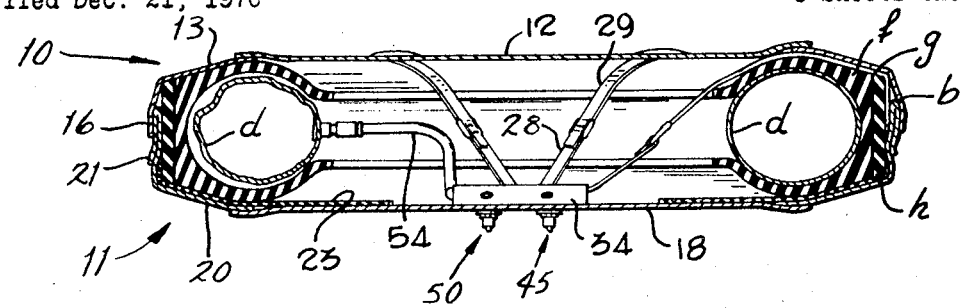
FIG. 6 is a sectional view taken along line 6—6 of FIG. 5. For clarity two forward straps are not shown.
Figure 5:
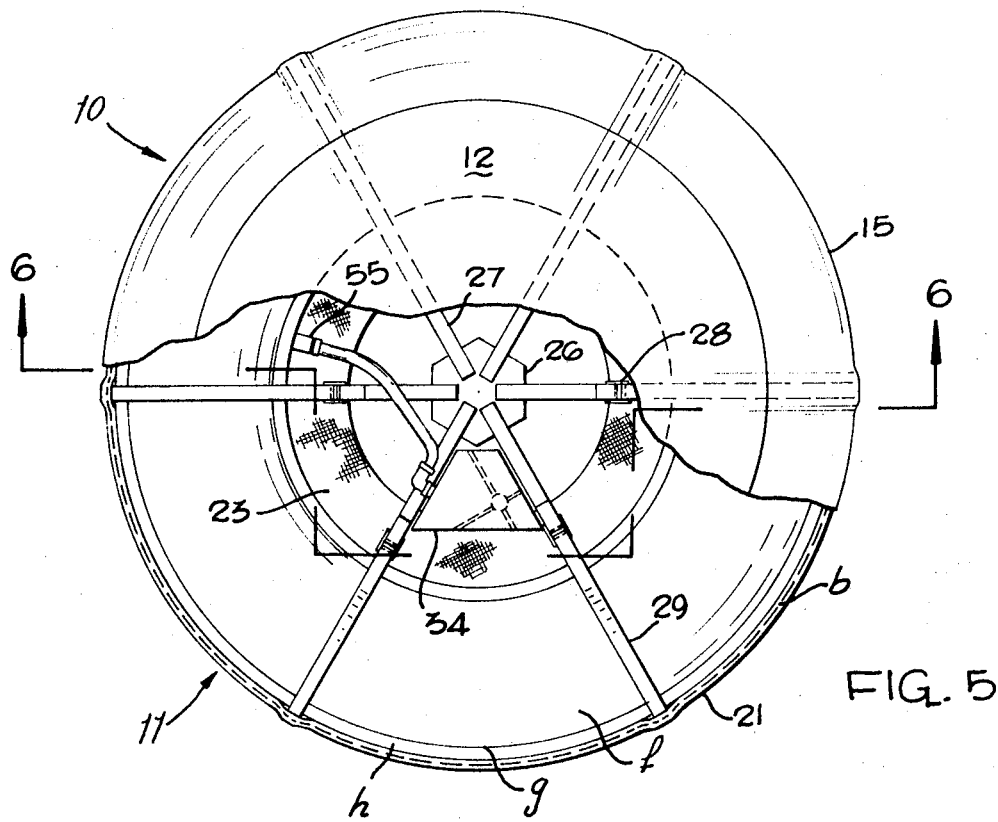
FIG. 5 is a view from above showing the membranes of FIGS. 1 and 2 preliminarily assembled onto a tire casing to be recapped, the margin of the lower membrane being folded back from a fold line.

Secured along the inner wall of the outer membrane portion 19, commencing spacedly below its outermost circumference 20, are an equal number of air wicking straps 29. Their outer ends are vulcanized to the inner surface of the outer portion 19; their inner portions are preferably surfaced with one type of Velcro material, and they terminate in strap tips 31 made of a mating type of Velcro material. When the straps 29 are brought radially inward over a tire casing, as shown in FIGS. 5 and 6, the tips 31 may be inserted through the buckles 28 and pressed back onto the Velcro portions 30 with which they mate. While the straps 27, 29 may be formed entirely of Velcro material, through whose thickness air will flow, ordinary flexible straps will serve a wicking function satisfactorily inasmuch as their thickness provides for the radially inward passage of air along the strap edges.

Figure 7:
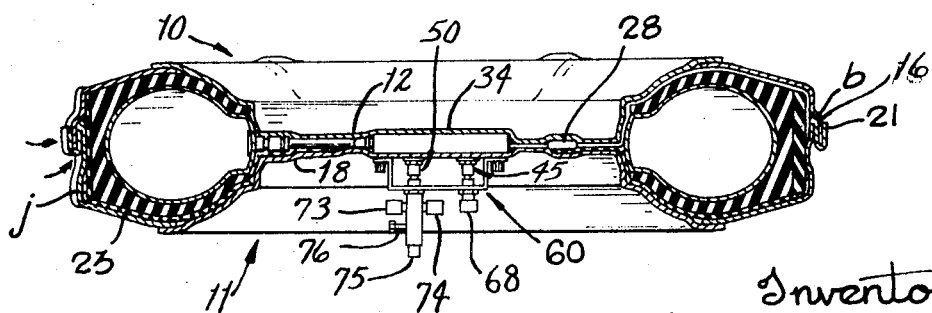
FIG. 7 is a view similar to FIG. 6 showing the outer margin of the lower membrane refolded upward, with the FIG. 4 assembly in place, and after air has been evacuated from between the membranes.

In addition to wicking the passage of air, the straps 27, 29 serve to stabilize the position of the lower membrane 11 when fitted about the casing and tread strip to be recapped, as shown in FIGS. 5 and 6. When this position-stabilizing function may not be necessary, as where the membrane 11 is sized to fit closely about the casing tread strip with little tension, the straps 27, 29 may be dispensed with; and a piece of burlap wicking material, similar in texture and diameter to the wicking piece 23, may be adhered to the entire undersurface of the upper central portion 12 outwardly into the rounded outer portion 13. Like the straps 27, 29, such texile material serves to conduct air from the molded outer portions 13, 19 of the membranes 10, 11 to substantially the middle of their circular central portions 12, 18. By "middle" is meant that part which, when air is evacuated as shown in FIG. 7 will lie inwardly of the tire beads.

A spacer block generally designated 34 is provided between the central membrane portions 12, 18 to hold them locally separated from each other as air is evacuated therebetween. If only burlap were used as the wicking means, the spacer block 34 might be located at the precise center of the circular portions 12, 18. However with the radial strap assembly shown in the drawings, the spacer block 34 is located slightly off center as best shown in FIG. 5. Referring to the enlarged FIG. 3, which shows the spacer block 34 inverted, it is relatively flat, having a broad surface 35 positioned sealedly against the inner surface of the central membrane portion 18 of the lower membrane 11. Its edges include a radially inward presented edge surface 36 which is relatively small to fit between the converging straps 27 adjacent to it, radially outward slanting side edge surfaces 37, 38, and a rear edge surface 39. The thickness of the spacer block 34 is great enough to accommodate horizontally drilled passages, to be described, for evacuating air and for providing communication from the outside to an inner tube positioned in the casing to be recapped as best shown in FIGS. 5 and 6. This thickness holds the central membrane portions 12, 18 locally separated from each other, to permit drawing air from the region of the adhesive joint to be vulcanized, radially inward through the wicking means, to the air evacuation passages to be described.

Radiating from the inner end of a tapped vertical bore 41, drilled in the surface 35 and extending midway through the spacer block 35, are two horizontal cross passages 42, 43 shown in dashed lines. The passage 42 extends to openings in both the front edge surface 36 and rear edge surface 39; the cross passage 43 communicates between the side surface 37 and the rear edge surface 39. The bore 41 is at the outlet end of the evacuation passage system so formed. To hold it sealedly positioned against the membrane central portion 18, which is pierced to provide communication to it, is the fixed part generally designated 45 of a releasable vacuum coupling. The fixed coupling part 45 includes a nipple end 46, screwed into the threads of the bore 41, a sealing nut 47, washer 48, and conventional quick release fitting connector 49.

A similar coupling part generally designated 50 is provided in a similar short bore 51 drilled in the spacer block surface 35 spaced away from the bore 41. The bore 51 serves as the inlet end of inflation passage means, communicating with a horizontal passage 52 extending horizontally midway through the spacer block 34 to the side edge surface 38. Here the end of the passage 52 is tapped to receive the end elbow 53 of a flexible pressure hose 54 having an inner end coupling 55 for screw attachment to the threaded valve stem of an inner tube $d$, as shown in FIG. 6. Screwing the fittings 45, 50 through pierced holes (not shown) in the membrane central portion 18 seals the evacuation passage means and inflation air passage means.

Drilled in the spacer block 34 outwardly adjacent to the bores 41, 51 are two small tapped bores 57, for attachment of the valve and bracket assembly generally designated 60 shown inverted in FIG. 4. A bridge-like metal bracket 61 extends horizontally and spacedly above two footed ends 62, which are threaded to receive two knurled thumb screws 63, spaced to fit into the bores 57.

The threaded ends of the thumb screws fit through small holes pierced through the membrane position 18. Tightening the heads of the thumb screws against the footed ends 62 seals the membrane portion 18 about these pierced holes.

Mounted on the bridge of the bracket 61 to extend downwardly and simultaneously engage and disengage the fixed evacuation fitting part 45 and the fixed inflation fitting part 50, are a removable mating evacuation fitting part 65 and a removable inflation fitting part 66. These are conventional quick release fitting parts. Nuts 67 position them at the precise height required for sealed mating. The evacuation fitting part 65 leads upwardly to a vacuum check valve 68 mounted onto the bracket 61 and having threads to which a vacuum hose 69 may be coupled, by a coupling nut 70, to a source of vacuum, not shown. The inflation fitting part 66 leads upwardly to a hollow pressurizing stem 72. At one side of the stem 72 is connected an ambient pressure inlet valve 73, set to open at a small increment of ambient pressure over internal pressure, for example 0.15 to 0.20 pound per square inch. Opposite it on the stem 72 is connected a pressure relief valve 74, set to open and relieve internal pressure exceeding ambient pressure by an increment sufficient to maintain the inner tube $d$ rounded within the casing, for example two pounds per square inch. Thus the ambient pressure inlet valve 73 will admit ambient air (or other gas which may be used in a pressurized vulcanizing chamber) to and through the pressure hose 44 and thence to the tube $d$ as soon as the ambient pressure rises above 0.20 pound per square inch while the pressure relieve valve 44 will discharge internal pressure from the tube whenever its pressure exceeds ambient pressure by two pounds. Operation of these valves is discussed subsequently.

For quick preliminary inflation of the inner tube $d$ to roundness, prior to evacuating air from between the membranes 10, 11, a conventional physically displaceable pressurizing inlet valve 75, such as used to inflate inner tubes, is employed at the tip of the stem 72. The stem also has a threaded nipple inlet 76, here shown closed by a cap nut 77, used for testing or monitoring pressures.

In use, a tire casing $f$ is preliminarily buffed to remove the tread and present a flat cylindrical surface. A layer of heat curable vulcanizing adhesive $g$, such as vulcanizable gum rubber or conventional suitable rubber base adhesive, is coated over the buffed cylindrical surface, and a conventional pre-vulcanized tread strip $h$ whose length corresponds to the perimeter of the buffed casing $f$ is mounted and preliminarily secured over the adhesive $g$. An uninflated inner tube $d$ is positioned within the casing; but no rim is used between the beads $j$. When the tube $d$ is inflated and air between the membranes 10, 11 is evacuated, the tube $d$ will expand and bulge to fill the space within the casing $f$ and extend between the beads $j$ as shown in FIG. 7. Its proper positioning shown in FIG. 7 may then be verified by visual observation.

The lower membrane 11 is then mounted about the casing $f$ and tread strip $h$ with its margin 21 turned back to the position shown in FIG. 6. Inasmuch as the tread strip $h$ presents a cylindrical contour over which the round membrane margin 21 must be stretched, and whose perimeter is substantially greater than the edge of the margin 21, the elastic material of the margin 21 will be under substantial tension. To aid a workman in stetching and fitting the membrane 11 in place with the backfold line $b$ somewhat above midheight of the tread strip $h$, the strap portions 29 are secured to the buckles 28, as shown in FIGS. 5 and 6. The pressure hose coupling 55 is then tightly screwed to the inlet of the inner tube $d$.

The upper membrane 10 is then applied as shown in FIG. 6, stretching its molded portion 15 out of round and bringing its margin 16 down over the backfold line $b$ to overlap a substantial part, say approximately half, of the lower membrane margin 21. The portion of the margin 21 which remains exposed is then refolded upwardly as shown in FIG. 7, stretching it back over the upper membrane margin 16. From the left side of FIG. 2 it is seen that the circumferential length of the edge of the margin 21 is much shorter than at its radially outermost circumference. By refolding, tension on the margin 21 is increased, sealing it against the outer surface of the upper membrane margin 16.

The bracket assembly 60 is then mounted in place. The removable fitting parts 65, 66 of the vacuum and pressure fittings are superimposed over the corresponding fitting fixed parts 45, 50; the thumb screws 63 are inserted through small pierced holes in the membrane central portion 18, screwed into the bores 57 of the spacer block 34, and sealed by tightening the thumb screws 63 to draw the bracket feet 62 tightly against the membrane portion 18. The tube is then inflated to roundness by supplying air under pressure through the displaceable valve 75. When it reaches a pressure of two pounds per square inch, the pressure relief valve 74 will open, to avoid distending the natural configuration of the casing.

With the tube $d$ so inflated to roundness, the vacuum hose 69 is attached to the outlet end 65 of the vacuum fitting 65, and a source of vacuum is applied. Air between the membrances 10, 11 is thus evacuated. The rubber material, of which the membrane central portions 12, 18 and outer portions 13, 19 are made, is stretchable so that, with the air evacuated, the central portions 12, 18 will be drawn together substantially as shown in FIG. 7 and the inner tube $d$ will be inwardly distended to meet them, without materially affecting its internal pressure relative to ambient pressure. The result is to leave the casing in its same natural configuration as before the air was evacuated. A visual check is then made to be sure that the tube $d$ fits smoothly against the membranes 10, 11, as in FIG. 7, and the vacuum hose 69 is then removed. The assembly is then permitted to set while other tire casings are being similarly prepared for recapping; and after setting for several minutes, visual observation is made whether leakage occurs, for example at the refolded joint of the membrane margins 16, 21. If the membranes 10, 11 maintain their configuration with their central portions 12, 18 pressed tightly together and the tread pattern sharply defined, it will be apparent that there has been no such leakage.

Sharp definition of the tread pattern, after evacuation, is a sign of the efficacy of the wicking means. The coarse textile wicking piece 23 and the side edges of the straps 29 extending radially inward over the casing $f$ serve as channels to conduct air from the casing $f$ to the spacer block 34 as it is evacuated between the membranes 10, 11. Indentations in the tread strip $h$ and circular ridges as usually provided in the radially outer side walls of tire casings provide added channels for conducting air to the sides of the straps 29. Where Velcro material is used, its air-perviousness will allow air to be conducted directly through it.

Backfolding the margin 21 over the upper membrane margin 16 seals the refolded margin 21 not only against the outer surface of the margin 16, but also against its inner surface, as will now be explained. When ambient pressure exceeds pressure within the membranes 10, 11, the molded membrane portions 13, 19 which overlie grooves in the tread strip will be drawn into its grooves, as shown somewhat simplified at the left side of FIG. 7. However the margin 21, under substantial tension by reason of being stretched circumferentially, will bridge the tread grooves, permitting ambient air to enter the grooves and press the underside of the margin 21 outwardly against the underside of the overlying margin 16. Thus, the pressure of ambient air will hold the margin 21 sealed against both the outer and the inner surfaces of the top membrane margin 16. With the aid of such tension, the seal effected is so secure as to permit a fairly substantial variation in diameters and thicknesses of the casings and tread strips; this reduces the number of sets of membranes required for a commercial recapping operation.

Inasmuch as a conventional vulcanizing pressure chamber will accommodate six or more tires simultaneously, several casings, each prepared for recapping as aforesaid, are then placed in a conventional vulcanzing chamber, for heat curing at a pressure suitable for the compounds to be vulcanized and heat cured, say approximately 200° F., and at a pressure of about 85 pounds per square inch above atmospheric pressure. I prefer to support the casings in horizontal position so that their weight will not distort their shape. The vacuum check valve 68 is connected to a hose leading to the outside of the chamber. Pressure applied within the chamber will force out, through such hose, air and gases formed during vulcanization. To achieve this purpose even more fully, I couple such hose to an external source of vacuum. Unlike prior art processes, the air inlet stem 72 is not connected to any pressurizing source.

The pressure chamber is then sealed, heat is supplied to it, and the ambient air pressure within the chamber is gradually increased from atmospheric pressure to the maximum pressure under which vulcanizing is to take place. As soon as the pressure within the chamber exceeds the very low pressure at which the ambient pressure inlet valve 73 is set, it will open, causing the pressure within the tube $d$ to rise with the ambient pressure. The natural configuration of the casing, which should be maintained until vulcanization is complete, will not therefore be distorted by such rise of ambient pressure within the chamber.

After heat curing at sufficient pressure and temperature to obtain vulcanization and complete curing of the adhesive rubber layer $g$, the pressure in the chamber is lowered. As soon as it lowers by that pressure increment for which the pressure relief valve 74 is set, the relief valve 74 opens to blow off excess pressure within the tube $d$, and it continues to do so as the chamber pressure is lowered to atmospheric pressure. Then the chamber is opened and the recapped casing removed. The tube pressure will then again equal such increment over atmospheric pressure, here two pounds per square inch. The bracket assembly 60 is then removed; the refolded margin 21 of the lower membrane 11 is unfolded; and the two membranes 10, 11 and the tube $d$ are removed from the recapped casing.

The threaded nipple inlet 76 is provided to permit testing of the valve apparatus and verification that the pressure within the inner tube $d$ is in fact rising and falling with the ambient pressure within the vulcanizing chamber. For this purpose, the cap nut 77 may be removed and the nipple 76 connected through a pressure hose to a gauge positioned outside the pressure chamber alongside its principal pressure gauge. Observing these gauges will aid in controlling the rate at which the chamber is pressurized and depressurized, so as not to exceed the flow capacity of the inlet valve 73 and relief valve 74.

I claim:

1. Tire recapping apparatus for use with an inner tube and within a pressurizable vulcanizing chamber, for adhering a pre-formed tread strip to a tire casing under pressure, comprising
   sealable, air-impermeable membrane means to envelope such casing containing such inner tube,
   an air evacuation outlet through said membrane means, and
   inflation passage means operable within such vulcanizing chamber to communicate air from the exterior of said membrane means and only from such chamber to such inner tube, said means having at one end an inflation inlet and terminating at the other in a coupling, whereby to be connectable to such inner tube, together with
   valve apparatus, external to said membrane means and including a hollow pressurizing stem connectable to said inflation inlet, said pressurizing stem having
   first valve means to open on an excess of external pressure over internal pressure, and second valve means to open on an excess of internal pressure over external pressure,
   whereby, when an inner tube is connected to the coupling of said inflation passage means to whose inlet the valve apparatus is connected, and such inner tube is positioned within a tire casing previously prepared for retreading with a tread strip thereon, and said membrane means is sealed thereabout and all said assembled and connected elements are placed in such a pressurizable chamber, elevation of pressure within the chamber will be communicated into the inner tube and on lowering of the chamber pressure such elevated inner tube pressure will be vented into the chamber, without air inlet connection from outside the chamber.

2. Tire recapping apparatus as defined in claim 1, wherein
   the amount of such excess of internal pressure over external pressure at which said second valve means opens, is substantially that pressure necessary to bring such inner tube to roundness,
   the pressurizing stem of said valve apparatus further having third valve means to open on physical displacement,
   whereby to permit preliminary inflation of such inner tube to roundness at that excess of internal over external pressure limited by said second valve means.

3. Tire recapping apparatus as defined in claim 1, wherein
   the said membrane means comprises two membranes having outer portions extending about and overlapping sealedly at such tread strip and having circular central portions, whereby to extend opposite each other across the central circular opening of such casing and to be drawn together inwardly of the beads of such casing when air is evacuated therebetween, and wherein
   the said air evacuation outlet extends through the circular central portion of one of said membranes and terminates outwardly thereof in a coupling, together with
   a spacer block positioned sealedly against the inner surface of the central circular portion of said membrane,
   the spacer block having a spacing edge and an air evacuation passage extending therethrough from said spacing edge to the air evacuation outlet of said membrane,
   whereby to facilitate evacuation of air from the interior of said membrane means.

4. Tire recapping apparatus as defined in claim 1, wherein
said sealable, air-impermeable membrane means comprises two similar membranes formed of rubber, and the outer portions of each are molded substantially to the configuration of that radially outer portion of an inner tube which extends curvedly to and beyond the outermost circumference thereof whereby to provide marginal portions which overlap sealedly.

References Cited
UNITED STATES PATENTS

| | | | |
|---|---|---|---|
| 3,325,326 | 6/1967 | Schelkmann III | 156—96 |
| 3,236,709 | 2/1966 | Carver | 156—96 |
| 3,207,647 | 9/1965 | Schelkmann | 156—394 |
| 2,966,936 | 8/1961 | Schelkmann | 156—96 |

ALFRED L. LEAVITT, Primary Examiner
C. B. COSBY, Assistant Examiner

U.S. Cl. X.R.
156—96, 129; 264—36, 315, 316; 425—39, 43, 44, 45